(12) United States Patent
Christensen et al.

(10) Patent No.: US 9,889,403 B2
(45) Date of Patent: Feb. 13, 2018

(54) SOLID AMMONIA STORAGE AND DELIVERY MATERIAL

(71) Applicants: Claus Hviid Christensen, Lynge (DK); Tue Johannessen, Glostrup (DK); Ulrich Quaade, Bagsværd (DK); Jens Kehlet Nørskov, Naerum (DK); Rasmus Zink Sørensen, Vedbæk (DK)

(72) Inventors: Claus Hviid Christensen, Lynge (DK); Tue Johannessen, Glostrup (DK); Ulrich Quaade, Bagsværd (DK); Jens Kehlet Nørskov, Naerum (DK); Rasmus Zink Sørensen, Vedbæk (DK)

(73) Assignee: AMMINEX EMISSIONS TECHNOLOGY A/S, Soborg (DK)

( * ) Notice: Subject to any disclaimer, the term of this patent is extended or adjusted under 35 U.S.C. 154(b) by 766 days.

(21) Appl. No.: 13/777,175

(22) Filed: Feb. 26, 2013

(65) Prior Publication Data

US 2013/0230443 A1    Sep. 5, 2013

Related U.S. Application Data

(62) Division of application No. 11/658,986, filed as application No. PCT/DK2005/000516 on Aug. 3, 2005, now abandoned.

(30) Foreign Application Priority Data

Aug. 3, 2004   (DK) ................................. 2004-01179
Feb. 3, 2005   (DK) ................................. 2005-00166
Jun. 25, 2005  (DK) ................................. 2005-00926

(51) Int. Cl.
*B01D 53/94* (2006.01)
*B01D 53/56* (2006.01)
(Continued)

(52) U.S. Cl.
CPC ........... *B01D 53/565* (2013.01); *B01D 53/90* (2013.01); *B01D 53/9431* (2013.01);
(Continued)

(58) Field of Classification Search
USPC ......................... 423/351, 352, 383, 395, 497
See application file for complete search history.

(56) References Cited

U.S. PATENT DOCUMENTS 1,698,847 A    1/1929   Keyes
2,019,356 A    10/1935  Normelli
(Continued)

FOREIGN PATENT DOCUMENTS

DE    647254      6/1937
DE    3422175 A1  12/1985
(Continued)

OTHER PUBLICATIONS

Stieger, Dirk, "Entwicklung eines Ammoniak-Generators zur Bereitstellung des Reduktionsmittels fuer die katalysierte NOx-Verminderung in sauerstoffreichen Kraftfahrzeug-Abgasen", Universitaet Karlsruhem, Institut fuer Chemische Technik, Dissertation, 2000; of record in parent.

(Continued)

*Primary Examiner* — Kaj K Olsen
(74) *Attorney, Agent, or Firm* — Abel Law Group, LLP

(57) ABSTRACT

Disclosed is a method for the selective catalytic reduction of $NO_x$ in waste/exhaust gas by using ammonia provides by heating one or more salts of formula $M_a(NH_3)_nX_z$, wherein M represents one or more cations selected from alkaline earth metals and transition metals, X represents one or more anions, a represents the number of cations per salt molecule, z represents the number of anions per salt molecule, and n is a number of from 2 to 12, the one or more salts having (Continued)

Holes for the thermocouples been compressed to a bulk density above 70% of the skeleton density before use thereof.

20 Claims, 7 Drawing Sheets

(51) Int. Cl.
| | |
|---|---|
| B01D 53/90 | (2006.01) |
| B01J 20/04 | (2006.01) |
| B01J 20/30 | (2006.01) |
| C01C 1/00 | (2006.01) |
| C01F 5/00 | (2006.01) |
| C01G 3/14 | (2006.01) |
| C01G 9/00 | (2006.01) |
| C01G 45/00 | (2006.01) |
| C01G 49/00 | (2006.01) |
| C01G 51/12 | (2006.01) |
| C01G 53/12 | (2006.01) |
| F01N 3/20 | (2006.01) |
| B01J 20/28 | (2006.01) |

(52) U.S. Cl.
CPC ...... *B01J 20/046* (2013.01); *B01J 20/28011* (2013.01); *B01J 20/3035* (2013.01); *C01C 1/006* (2013.01); *C01F 5/00* (2013.01); *C01G 3/14* (2013.01); *C01G 9/00* (2013.01); *C01G 45/00* (2013.01); *C01G 49/00* (2013.01); *C01G 51/12* (2013.01); *C01G 53/12* (2013.01); *F01N 3/2066* (2013.01); *C01P 2006/10* (2013.01); *F01N 2610/02* (2013.01); *F01N 2610/06* (2013.01); *F01N 2610/10* (2013.01); *Y02T 10/24* (2013.01)

(56) References Cited

U.S. PATENT DOCUMENTS

| | | | |
|---|---|---|---|
| 2,326,130 A | 8/1943 | Nils Erland af Kleen | |
| 2,431,470 A | 11/1947 | Fawkes | |
| 2,986,525 A | 5/1961 | Hughes | |
| 3,510,357 A | 5/1970 | Nielsen | |
| 3,669,743 A * | 6/1972 | Swindells et al. | 429/307 |
| 3,961,020 A | 6/1976 | Seki | |
| 4,848,994 A | 7/1989 | Rockenfeller et al. | |
| 5,298,231 A | 5/1994 | Rockenfeller | |
| 5,328,671 A | 7/1994 | Rockenfeller | |
| 5,384,101 A | 1/1995 | Rockenfeller | |
| 5,408,847 A | 4/1995 | Erickson | |
| 5,441,716 A | 8/1995 | Rockenfeller | |
| 5,891,409 A | 4/1999 | Hsiao et al. | |
| 6,301,879 B1 | 10/2001 | Weisweiler et al. | |
| 6,387,336 B2 * | 5/2002 | Marko et al. | 423/212 |
| 6,399,034 B1 | 6/2002 | Weisweiler | |
| 2001/0042378 A1* | 11/2001 | Pfister et al. | 62/112 |
| 2002/0023433 A1 | 2/2002 | Goerik et al. | |
| 2002/0028171 A1 | 3/2002 | Goetsch et al. | |
| 2003/0234011 A1 | 12/2003 | Breuer et al. | |
| 2005/0037244 A1 | 2/2005 | Goetsch et al. | |
| 2005/0274108 A1 | 12/2005 | Schulte et al. | |
| 2007/0207351 A1 | 9/2007 | Christensen et al. | |
| 2009/0280047 A1 | 11/2009 | Christensen et al. | |

FOREIGN PATENT DOCUMENTS

| | | |
|---|---|---|
| DE | 10313998 A1 | 10/2004 |
| EP | 0646635 A1 | 4/1995 |
| GB | 1066698 A | 4/1967 |
| WO | 9010491 A1 | 9/1990 |
| WO | 9411685 A1 | 5/1994 |
| WO | 9814400 A1 | 4/1998 |
| WO | 9901205 A1 | 1/1999 |
| WO | 0187770 A1 | 11/2001 |
| WO | 2005091418 A2 | 9/2005 |
| WO | 2006012903 A2 | 2/2006 |

OTHER PUBLICATIONS

Lui, Hui-Bo et al., "Modelling of Gas-Solid Reaction-Coupling of Heat and Mass Transfer with Chemical Reaction", Chem. Eng. Sci. 51(15), 1996, pp. 3829-3845.
Olovsson, I., "Packing Principles in the Structures of Metal Ammine Salts", Acta Cryst. 1965, 18, pp. 889-893.
Liu, Chun Yi et al., "Ammonia Absorption on Alkaline Earth Halides as Ammonia Separation and Storage Procedure", Bull. Chem. Soc. Jpn, 77, pp. 123-131, 2004.
Matsumoto, Shin'ichi, "Recent advances in automobile exhaust catalyst", Catalyst Surveys from Japan 1, pp. 111-117, 1997.
Touzain, Ph. et al., "Thermochemical Heat Transformation: Study of the Ammonia/Magnesium Chloride-GIC Pair in a Laboratory Pilot", Mol. Cryst. Liq. Cryst. 1994, Vo. 245, pp. 243-248.
CRC Handbook of Chemistry and Physics, 85th ed. 2004, p. 4-40.

* cited by examiner

Holes for the thermocouples

SOLID AMMONIA STORAGE AND DELIVERY MATERIAL

CROSS-REFERENCE TO RELATED APPLICATIONS

The present application is a divisional of U.S. application Ser. No. 11/658,986, which is a National Stage of PCT/DK2005/000516, filed Aug. 3, 2005, which claims priority of Danish patent applications PA 2004 01179, filed Aug. 3, 2004, PA 2005 00166, filed Feb. 3, 2005, and PA 2005 00926, filed Jun. 25, 2005. The entire disclosures of the aforementioned patent applications are expressly incorporated by reference herein.

BACKGROUND OF THE INVENTION

1. Field of the Invention

The present invention relates to the storage of ammonia in a solid form using metal ammine complexes and delivery there from. The invention also relates to the use of ammonia stored in a solid form as the reducing agent in selective catalytic reduction (SCR) of $NO_x$ in exhaust gases from combustion processes, to methods for producing such complexes and to an ammonia delivery device comprising such complexes.

2. Description of the Related Art

Current environmental regulations necessitate the use of catalysts in the exhaust gas from automotive vehicles, boilers and furnaces for control of $NO_x$ emission leaving the system. Particularly, vehicles equipped with diesel engines or other lean burn engines offer the benefit of improved fuel economy, but suffer from the drawback of increased formation of $NO_x$ being noxious and which must be eliminated from the exhaust gas. However, catalytic reduction of $NO_x$ using conventional so-called three-way exhaust catalysts for automobiles is impossible because of the high content of oxygen in the exhaust gas. Instead, selective catalytic reduction (SCR) has proven useful for achieving the required low levels of $NO_x$ in the exhaust gas both in stationary and mobile units. In such systems $NO_x$ is continuously removed from the exhaust gas by injection of a reducing agent into the exhaust gas prior to entering an SCR catalyst capable of achieving a high conversion of $NO_x$. So far, ammonia has proven to be the most efficient reducing agent, which is usually introduced into the exhaust gas by controlled injection of gaseous ammonia, aqueous ammonia or aqueous urea. In all cases, the amount of reducing agent being dosed has to be very precisely controlled. Injection of a too large amount of reducing agent will cause emission of ammonia with the exhaust gas whereas injection of a too small amount of reducing agent causes a less than optimum conversion of $NO_x$.

In many mobile units powered by combustion engines, the preferred technical solution is to use an aqueous solution of urea as the reducing agent since in this way potential hazards or safety issues relating to the transport and handling of liquid ammonia in high pressure containers are eliminated. However, there are several disadvantages related to the use of aqueous urea as the reducing agent. First of all, the use of urea solutions requires the carrying of a relatively large volume in order to provide sufficient amounts of ammonia to allow a vehicle to drive e.g. about 20,000 kilometres without having to substitute or refill the source of ammonia. In typical systems, an aqueous solution comprising about 30 wt % of urea is preferred meaning that about 70 wt % of the content of a container holding the urea solution is used only to transport water. During the decomposition, one molecule of urea forms two molecules of $NH_3$ and one molecule of $CO_2$ and thus, ammonia only constitutes roughly 50 wt % of the weight of the urea molecule and hence, the concentration of ammonia of the reducing agent is very low. Similar concentrations of ammonia can be achieved using aqueous solutions of ammonia as reducing agents. Furthermore, when using solutions, specially designed spray nozzles combined with a precision liquid pump are required to ensure that a) the aqueous urea is delivered to the exhaust system at a desired (and dynamically changing) flow rate and b) the aqueous urea is efficiently dispersed in the gas phase before entering the catalyst. Finally, the aqueous solutions might freeze in cold weather conditions (below minus 11° C.), or the urea solution may simply form precipitates, which will block the dosing system, e.g. the nozzle. Altogether, these difficulties may limit the possibilities of using SCR technology in abatement of pollution from $NO_x$, particularly in connection with mobile units.

Transporting ammonia as a pressurized liquid is hazardous as the container may burst or a valve or tube might break in an accident giving a discharge of poisonous/lethal gaseous ammonia. In the case of the use of a solid storage medium containing absorbed/adsorbed ammonia, the safety issues are much less critical since a small amount of heat is required to release the ammonia from the storage medium.

International Patent Publication No. WO 99/01205 discloses a method and a device for selective catalytic NOx reduction in waste gases containing oxygen, using ammonia and a reduction catalyst. According to the method, gaseous ammonia is provided by heating a solid storage medium comprising one or more salts, especially a chloride and/or sulphate of one or more cations selected from alkaline earth metals, and/or one or more transition metals, preferably Mn, Fe, Co, Ni, Cu, and/or Zn, said storage medium being introduced into a container. In the preferred embodiments of WO 99/01205 the cation is $Ca^{2+}$ or $Sr^{2+}$. The inventive method and device are stated to be particularly suitable for use in automobiles.

However, the use of the ammonia storage media known from WO 99/01205 suffers from various draw-backs hampering a wide-spread use in the automotive industry. The vapour pressure of ammonia above a solid salt phase is e.g. about 1 bar at room temperature and atmospheric pressure for calcium octa ammine chloride and strontium octa ammine cchloride complexes rendering the use somewhat complicated due to the high pressures that must be taken into account in view of the toxicity of ammonia. Having such a high partial pressure of ammonia, the handling and transportation of the saturated storage material is still difficult and also dangerous. Still further, the use of granulated storage materials—stated as preferred embodiments in WO 99/01205—requires measures for preventing the storage material from leaving the container during use in moving vehicles. Furthermore, a granulated material will have a considerable void between the granules which will drastically reduce the bulk density of the storage material by a factor 1.5-2.

It has now been found that these drawbacks may be overcome using a magnesium salt complex according to the present invention providing a compact, light-weight, cheap and more safe storage for ammonia having a very low vapour pressure of ammonia below 0.1 bar at room temperature to be used in the automotive industry.

SUMMARY OF THE INVENTION

The present invention relates to a solid ammonia storage and delivery material comprising:

an ammonia absorbing salt, wherein the ammonia absorbing salt is an ionic salt of the general formula:

$M_a(NH_3)_nX_z$, wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12, wherein M is Mg.

In a second aspect the invention relates to a method of producing a solid ammonia storage and delivery material comprising:
an ammonia absorbing salt, wherein the ammonia absorbing salt is an ionic salt of the general formula:

$M_a(NH_3)_nX_z$, wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12, said method comprising the steps of
1) providing the solid salt,
2) saturating the salt with ammonia, and
3) compressing the ammonia salt complex.

In a third aspect the invention relates to a method for selective catalytic $NO_x$ reduction in waste gases containing oxygen, using ammonia and a reduction catalyst wherein gaseous ammonia is provided by heating a solid storage medium comprising one or more ionic ammonia absorbing salts of the general formula:

$M_a(NH_3)_nX_z$, wherein M is one or more cations selected from alkaline earth metals, and transition metals such as Mn, Fe, Co, Ni, Cu, and/or Zn, X is one or more anions such as chloride or sulphate ions, a is the number of cations per salt molecule, z is the number of anions per salt molecule, and n is the coordination number of 2 to 12, wherein M is Mg and wherein the release rate of ammonia is controlled in consideration of the content of $NO_x$ in the waste gases.

In a fourth aspect the invention relates to the use of a solid ammonia storage and delivery material comprising:
an ammonia absorbing salt, wherein the ammonia absorbing salt is an ionic salt of the general formula:

$M_a(NH_3)_nX_z$, wherein M is one or more cations selected from alkaline earth metals, and transition metals such as Mn, Fe, Co, Ni, Cu, and/or Zn, X is one or more anions such as chloride or sulphate ions, a is the number of cations per salt molecule, z is the number of anions per salt molecule, and n is the coordination number of 2 to 12, wherein M is Mg as a source of ammonia as the reducing agent in selective catalytic reduction (SCR) of $NO_x$ in exhaust gases from combustion processes.

In a fifth aspect the invention relates to an ammonia delivery device comprising a container comprising
an ammonia absorbing salt, wherein the ammonia absorbing salt is an ionic salt of the general formula:

$M_a(NH_3)_nX_z$, wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12, wherein M is Mg, said container being provided with one or more closable outlet opening(s) connected to a pipe and further being provided with means for heating the container and the ammonia absorbing salt for release of gaseous ammonia.

In a sixth aspect the invention relates to the use of an ammonia delivery device comprising a container comprising an ammonia absorbing salt, wherein the ammonia absorbing salt is an ionic salt of the general formula:

$M_a(NH_3)_nX_z$, wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12, wherein M is Mg, said container being provided with one or one or more closable outlet opening(s) connected to a pipe and further being provided with means for heating the container and the ammonia absorbing salt for release of gaseous ammonia as a source for ammonia in selective catalytic reduction of $NO_x$ in exhaust gases from combustion processes.

In a seventh aspect the invention relates to a solid ammonia storage and delivery material comprising:
an ammonia absorbing salt, wherein the ammonia absorbing salt is an ionic salt of the general formula:

$M_z(NH_3)_nX_z$, wherein M is one or more cations selected from alkali metals, alkaline earth metals, and transition metals such as Li, Na, K, Cs, Mg, Ca, V, Cr, Mn, Fe, Co, Ni, Cu, or Zn or combinations thereof such as NaAl, KAl, $K_2$Zn, CsCu, or $K_2$Fe, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12, said storage and delivery material having a density of 0.9 to 1.3 g/cm$^3$.

BRIEF DESCRIPTION OF THE DRAWINGS

The invention is disclosed more in detail with reference to the drawings in which.

DETAILED DESCRIPTION OF THE PRESENT INVENTION

Figure 1:
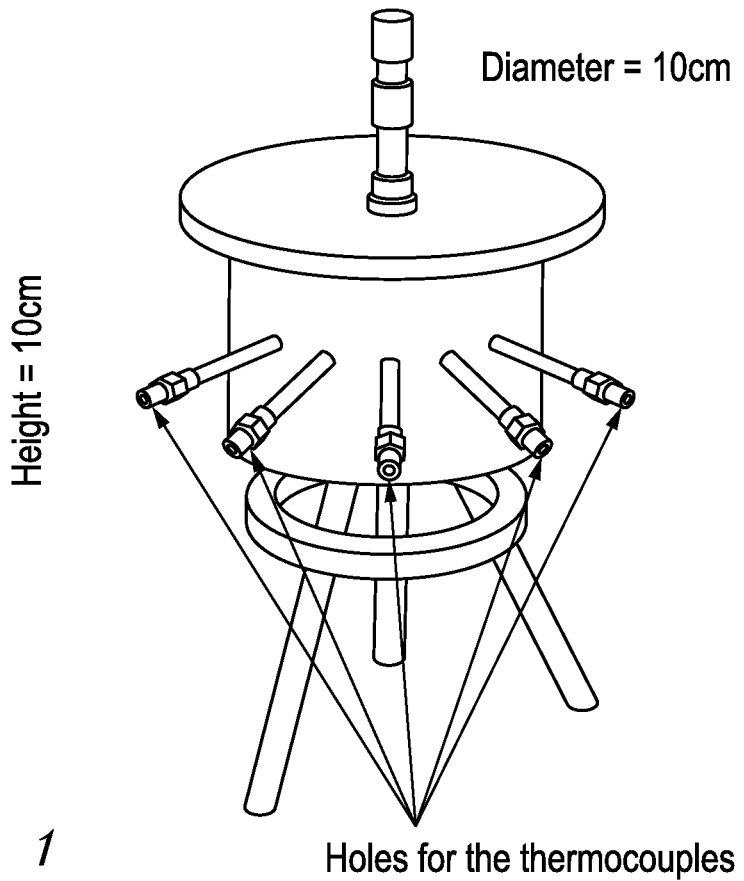
FIG. 1 shows a photograph of an ammonia delivery device of the invention.

The present invention is related to the use of metal-ammine salts as safe and efficient solid storage media for storage and controlled delivery of ammonia, which in turn is used as the reduction agent in selective catalytic reduction to reduce NO$_x$ emissions, especially from automotive vehicles, boilers and furnaces.

The present invention relates to a solid ammonia storage and delivery material comprising:

an ammonia absorbing salt, wherein the ammonia absorbing salt is an ionic salt of the general formula:

$$M_a(NH_3)_nX_z,$$

wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12, wherein M is Mg.

Suitable anions to be used according to the present invention may be selected from fluoride, chloride, bromide, iodide, nitrate, thiocyanate, sulphate, molybdate, and phosphate ions. The anion is preferably the chloride.

A preferred solid ammonia delivery material according to the invention is Mg(NH$_3$)$_6$Cl$_2$.

It has been found that although Mg(NH$_3$)$_6$Cl$_2$ has a very low partial oressure of ammonia above a salt phase, below 0.1 bar at room temperature, it is very suitable for use as a source of ammonia in SCR technology for abatement of pollution from NO$_x$.

A solid ammonia storage and delivery material comprising:

an ammonia absorbing salt, wherein the ammonia absorbing salt is an ionic salt of the general formula:

$$M_a(NH_3)_nX_z,$$

wherein M is one or more cations selected from alkaline earth metals, and/or one or more transition metals, such as Mn, Fe, Co, Ni, Cu, and/or Zn, X is one or more anions selected from chloride and sulphate ions, a is the number of cations per salt molecule, z is the number of anions per salt molecule, and n is the coordination number of 2 to 12, and the use thereof are also considered aspects of the present invention.

An ammonia saturated material of the invention may be prepared by exposing the dry salt to gaseous ammonia in a manner known per se.

The ammonia saturated delivery material as prepared is powdery and rather "fluffy" and difficult to handle or transport and may be—during transport or use—transformed into small particle fragments thereby potentially blocking the dosing system of a device or give rise to hazardous dust into the environment. Furthermore, the powder has a low bulk density.

In a preferred embodiment of the invention the solid delivery material has a density of 0.9 to 1.3 g/cm$^3$, more preferred a density of 1.1 to 1.3 g/cm$^3$ giving a very high-density storage and delivery material.

The compacted material shows a very low release rate of ammonia at room temperature and atmospheric pressure and may be handled without special precautionary measures for protection against the action of ammonia. The compacted material can easily be handled during transport and during and after the final application.

It has surprisingly been found that a powdered ammonia delivery material of the present invention having a very low vapour pressure of ammonia at room temperature may be compacted to a very high density using several different methods for shaping of the material into a desired form and still be capable of delivery of ammonia at a sufficient rate to be suitable for use as a source of ammonia for a SCR reduction of NOx in e.g. automotive vehicles, boilers and furnaces. Such methods are e.g. pressing, extrusion, and injection moulding. In the case of pressing, a pressure might be applied in several different ways in a manner known per se. In one embodiment, the material is compressed to shapes like dense blocks or tablets by placing the saturated salt in a groove/dent/hole/pit in a metal block (e.g. in a cylindrical hole) and applying pressure to compress the material using a corresponding piston.

The saturated material is preferably compressed to a bulk density above 70%, more preferred above 80% and even more preferred above 85%, of the skeleton density. In a preferred embodiment the present invention is related to the compaction and shaping of the saturated ammonia delivery material.

When an ammine complex of a salt is compressed to such a high extent, desorption from such a compacted material would be expected to be extremely slow, mostly due to diffusion hindrance. In most dense materials desorption of ammonia would involve solid state diffusion which is known to be a slow process for virtually all materials. This has surprisingly been found not to be the case for the dense materials according to the present invention. It has been found that when ammonia desorbs, a progressing nano-porous structure is formed as the "reaction front" proceeds, leaving open paths for additional ammonia to leave from the central parts of the body of storage material. This is in contrast to e.g. classical heterogeneous catalysis where conversion of reactants is only possible, if reactants are able to diffuse into the catalyst pore structure and the products are able to diffuse out of the catalyst pore structure.

The metal-ammine salts constitute a solid storage medium for ammonia, which represent a safe, practical and compact option for storage and transportation of ammonia (a single-crystalline compound of Mg(NH$_3$)$_6$Cl$_2$ has an ammonia density of 38 kmole NH$_3$/m$^3$, whereas that of liquid ammonia is only slightly higher (40 kmole NH$_3$/m$^3$)). Ammonia may be released from the metal ammine salt by heating the salt to temperatures in the range from 10° C. to the melting point of the metal salt ammine cornplex, preferably to a temperature from 100 to 700° C., more preferred to a temperature from 150 to 500° C.

During release of ammonia the metal-ammine salt of the formula M$_a$(NH$_3$)$_n$X$_z$ wherein M, X, a, n, and z has the meaning stated above, is gradually transformed into a salt of the formula M$_a$(NH$_3$)$_m$X$_z$ wherein 0≤m<n. When the desired amount of ammonia has been released, the resulting salt of formula M$_a$(NH$_3$)$_m$X$_z$ can usually be converted back into the salt of the formula M$_a$(NH$_3$)$_n$X$_z$ by treatment with a gas containing ammonia.

Anhydrous MgCl$_2$ absorbs up to six moles of NH3 (Gmelins Handbuch, 1939; Liu, 2004) according to reactions 1 to 3:

$$MgCl_2(s)+NH_3(g)\leftrightarrows Mg(NH_3)Cl_2(s) \tag{1}$$

$$Mg(NH_3)Cl_2(s)+NH_3(g)\leftrightarrows Mg(NH_3)_2Cl_2(s) \tag{2}$$

$$Mg(NH_3)_2Cl_2(s)+4NH_3(9)\leftrightarrows Mg(NH_3)_6Cl_2(s) \tag{3}$$

Typical ammonia contents of the metal ammine complexes are in the range of 20-60 wt %, and preferred complexes comprise above 30 wt % ammonia, more preferred above 40 wt % ammonia. The inexpensive compound Mg(NH$_3$)$_6$Cl$_2$ contains 51.7 wt % ammonia.

The present invention offers ammonia storage at significantly higher densities (both on a volume and a weight basis)

than both aqueous ammonia and aqueous urea. For several metal ammine salts it is possible to release all ammonia and then transform the resulting material back into the original metal ammine salt in a large number of cycles. Additionally, the ammonia is directly delivered into the exhaust pipe as a gas, which is an advantage in itself—both for the simplicity of the flow control system and for an efficient mixing of reducing agent, ammonia, in the exhaust gas—but it also eliminates possible difficulties related to blocking of the dosing system because of precipitation in the liquid-based system.

Some metal ammine complexes offer a further advantage in that the vapour pressure of ammonia above a solid salt phase is relatively low. It is preferred that the vapour pressure is below 0.1 bar at room temperature, preferably below 0.01 bar. Specifically for $Mg(NH_3)_6Cl_2$ the vapour pressure is as low as 0.002 bar at room temperature and atmospheric pressure which in practice eliminates any noxious effect of the ammonia as the release of ammonia is as low or lower than the release from common cleaning materials containing ammonia.

For $Mg(NH_3)_6Cl_2$ the partial pressure of ammonia at room temperature is 0.002 bar. Even though a partial pressure of ammonia of 0.002 bar at ambient temperature in itself could cause health problems, the compacted material according to the invention saturated with ammonia releases ammonia at a very slow rate at ambient temperature and an equilibrium pressure of 0.002 bar will only be obtained after a considerable span of time, even if the material is placed in a very confined space. However, when raising the temperature e.g. in the delivery device, a quite quick desorption of ammonia is observed as discussed above.

For mobile units, it is particularly useful to use an ammonia delivery device comprising a container containing the metal ammine complex as such a container may easily be separated from mobile unit and replaced by a fresh at suitable intervals. In preferred embodiments, the metal ammine containers are recycled and recharged with ammonia in a separate recharging unit.

Due to the slow release of ammonia in open atmosphere at ambient temperatures for the compressed materials of the present invention, the handling of the materials does not require extensive safety precautions and substitution of exhausted storage and delivery material with fresh material does not require an encapsulation of the material facilitating the handling as compared to the handling of the materials used in the methods of the state of the art.

In another aspect the invention relates to a method of producing a solid ammonia storage and delivery material comprising an ammonia absorbing salt, wherein the ammonia absorbing salt is an ionic salt of the general formula:

$$M_a(NH_3)_nX_z,$$

wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12; said method comprising the steps of
1) providing the solid salt,
2) saturating the salt with ammonia, and
3) compressing the ammonia salt complex to a dense, shaped body.

In a preferred embodiment of the method of the invention, the ammonia salt complex is compressed to a density of 0.9 to 1.3 g/cm³, more preferred to a density of 1.1 to 1.3 g/cm³

In a further aspect the invention relates to a method of selective catalytic $NO_x$ reduction in waste gases containing oxygen, using ammonia and a reduction catalyst wherein gaseous ammonia is provided by heating a solid storage and delivery medium comprising one or more ionic ammonia absorbing salts of the general formula:

$$M_a(NH_3)_nX_z,$$

wherein M is one or more cations selected from alkaline earth metals, and transition metals such as Mn, Fe, Co, Ni, Cu, and/or Zn, X is one or more anions, a is the number of cations per salt molecule, z is the number of anions per salt molecule, and n is the coordination number of 2 to 12, wherein M is Mg and wherein the release rate of ammonia is controlled in consideration of the content of $NO_x$ in the waste gases.

In a yet further aspect the invention relates to the use of a solid ammonia storage and delivery material comprising: an ammonia absorbing salt, wherein the ammonia absorbing salt is an ionic salt of the general formula:

$$M_a(NH_3)_nX_z,$$

wherein M is one or more cations selected from alkaline earth metals, and ransition metals such as Mn, Fe, Co, Ni, Cu, and/or Zn, X is one or more anions, a is the number of cations per salt molecule, z is the number of anions per salt molecule, and n is the coordination number of 2 to 12, wherein M is Mg as a source of ammonia as the reducing agent in selective catalytic reduction (SCR) of $NO_x$ in exhaust gases from combustion processes.

In yet another aspect the invention relates to an ammonia delivery device comprising a container comprising an ammonia absorbing salt, wherein the ammonia absorbing salt is an ionic salt of the general formula:

$$M_a(NH_3)_nX_z,$$

wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12, wherein M is Mg, said container being provided with one or more closable outlet opening(s) connected to a pipe and further being ing provided with means for heating the container and the ammonia absorbing salt for release of gaseous ammonia.

In the ammonia delivery device according to the invention, the closure of the closable outlet opening(s) may be in the form of one or more valve(s) known per se for use in connection with ammonia.

Heating means may be in the form of an electrical resistive heating device known per se.

The heating means may alternatively be provided as heat produced by chemical reactions.

The salt is normally heated to temperatures in the range from 10° C. to the melting point of the metal salt ammine complex, preferably to a temperature from 100 to 700° C., more preferred to a temperature from 150 to 500° C.

In a preferred embodiment of the invention the release rate of ammonia is controlled by accurate control of the heating of the container and the ammonia absorbing salt for release of gaseous ammonia. The release of ammonia is preferably further controlled by reduction valves, flow controllers or similar equipment or units. The release of ammonia from a container is preferably controlled by interaction with an electronic engine control system for delivery of an optimum amount of ammonia in a specific ratio (e.g. NH₃: NOx=1:1) of the changing emission of NOx from the engine.

In still another aspect the invention relates to the use of an ammonia delivery device comprising a container comprising an ammonia absorbing salt, wherein the ammonia absorbing salt is an ionic salt of the general formula:

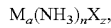

$$M_a(NH_3)_n X_z,$$

wherein M is one or more cations selected from alkaline earth metals, and/or one or more transition metals, such as Mn, Fe, Co, Ni, Cu, and/or Zn, X is one or more anions, a is the number of cations per salt molecule, z is the number of anions per salt molecule, and n is the coordination number of 2 to 12, wherein M is Mg, said container being provided with one or more closable outlet opening(s) connected to a pipe and further being provided with means for heating the container and the ammonia absorbing salt for release of gaseous ammonia as a source for ammonia in selective catalytic reduction of $NO_x$ in exhaust gases from combustion processes.

In yet a further aspect, the invention relates to a solid ammonia storage and delivery material comprising:
an ammonia absorbing salt, wherein the ammonia absorbing salt is an ionic salt of the general formula:

$$M_a(NH_3)_n X_z,$$

wherein M is one or more cations selected from alkali metals, alkaline earth metals, and transition metals such as Li, Na, K, Cs, Mg, Ca, V, Cr, Mn, Fe, Co, Ni, Cu, or Zn or combinations thereof such as NaAl, KAl, K₂Zn, CsCu, or K₂Fe, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12, said storage and delivery material having a density of 0.9 to 1.3 g/cm³.

Still further, the invention relates to a method of producing a solid ammonia storage and delivery material comprising an ammonia absorbing salt, wherein the ammonia absorbing salt is an ionic salt of the general formula:

$$M_a(NH_3)_n X_z,$$

wherein M is one or more cations selected from alkali metals, alkaline earth metals, and transition metals such as Li, Na, K, Cs, Mg, Ca, V, Cr, Mn, Fe, Co, Ni, Cu, or Zn or combinations thereof such as NaAl, KAl, K₂Zn, CsCu, or K₂Fe, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12, said storage and delivery material having a density of 0.9 to 1.3 g/cm³, said method comprising the steps of
1) providing the solid salt,
2) saturating the salt with ammonia, and
3) compressing the ammonia salt complex to a density of 0.9 to 1.3 g/cm³.

The present invention is especially suitable for use in reduction of emission of $NO_x$ in exhaust gases from stationary and mobile combustion engines or power plants fuelled by diesel oil, petrol, natural gas or any other fossil fuels.

Thus, the present invention is also especially suitable as a source for providing ammonia in selective catalytic reduction in exhaust gasses for reduction of emission from stationary and mobile combustion engines or power plants fuelled by methanol, ethanol, hydrogen, methane, ethane or any other synthetic fuels.

Mobile combustion engines for which the invention is suitable are may e.g. be automobiles, trucks, trains, ships or any other motorised vehicle.

The invention is particularly suitable for use in connection with reduction of $NO_x$ in combustion gases from automobiles and trucks.

Stationary power plants for which the invention is suitable are preferably power plants generating electricity.

The present invention is also especially suitable for use in reduction of emission of $NO_x$ in exhaust gases from solid oxide fuel cells (SOFC). SOFC's are operated at a high temperature, where there may be a small production of NOx, which can be removed by adding ammonia using the present invention.

DESCRIPTION OF THE PREFERRED EMBODIMENTS

The invention is now explained more in detail with reference to the drawings showing preferred embodiments of the invention.

Materials and Methods

MgCl₂ powder: anhydrous, >98% purity, Merck Schuchardt.

Glove-bag: Aldrich premium AtmosBag from Aldrich Chemical Company, Inc., 1001 West Saint Paul Ave., Milwaukee, Wis. 53233, USA.

Ammonia Gas: Ammonia Gas 99.9% from Hede Nielsen, Industriparken 27-31, 2750 Ballerup, Denmark.

Preparation of Ammonia Saturated MgCl₂ powder.

The ammonia carrier, Mg(NH₃)₆Cl₂, was prepared by placing MgCl₂ powder for several days in a glove-bag containing ammonia gas at atmospheric pressure (1 bar) and at room temperature. The degree of saturation was checked by temperature programmed desorption (TPD) and verified to be near 100% of the theoretical amount. The absorption/desorption was found to be fully reversible.

The rate of absorption is dramatically increased at higher NH₃ pressures (minutes rather than days) (Touzain and Moundamga-lniamy, 1994).

Figure 10:
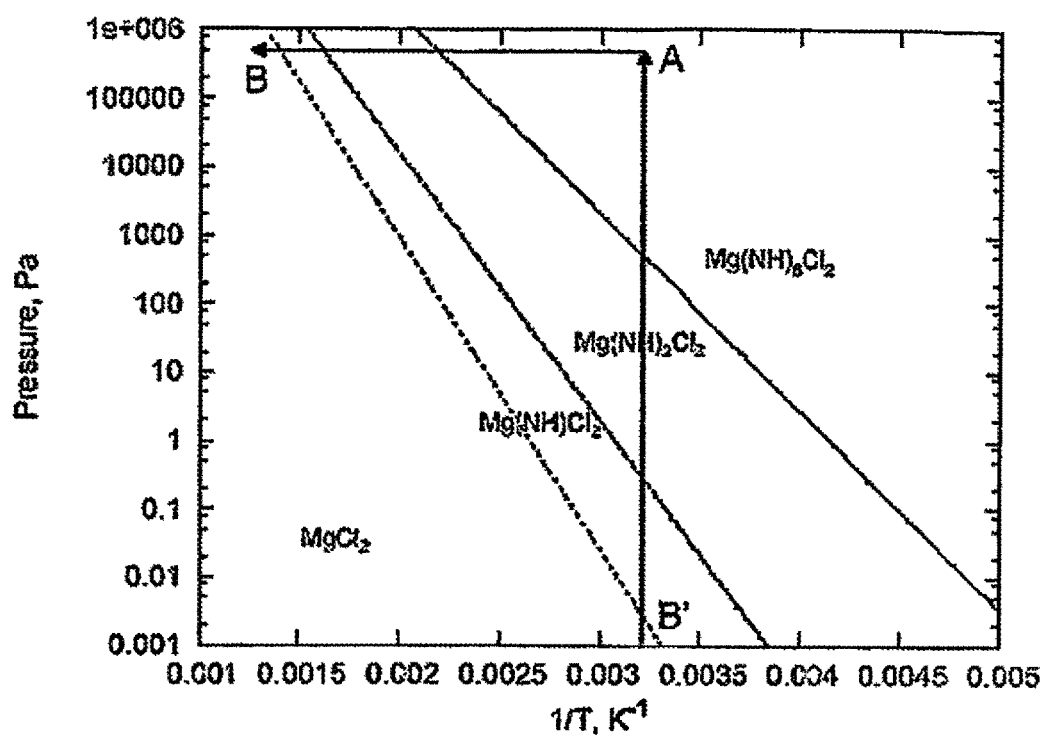
FIG. 10 shows an equilibrium phase-diagram for the $MgCl_2$—$NH_3$ system.

An equilibrium phase-diagram of the MgCl₂—NH₃ system is shown in FIG. 10 also showing the process of saturation when carried out at 5 bars.

Starting from point B' (pure MgCl₂) the pressure was increased to 5 bars at point A corresponding to an isothermal absorption at T=298.15K and resulting in the formation of fully saturated Mg(NH₃)₆Cl₂. The rate of formation depends on the equilibrium pressure drop; however absorption is generally quite fast at ammonia pressures of more than 4 bars (Touzain and Moundamga-Iniamy, 1994). As mentioned, the desorption reaction only proceeds at elevated temperatures, which is also indicated on the path from A to B (isobaric desorption at P=5 bar).

Example 1

Figure 2:
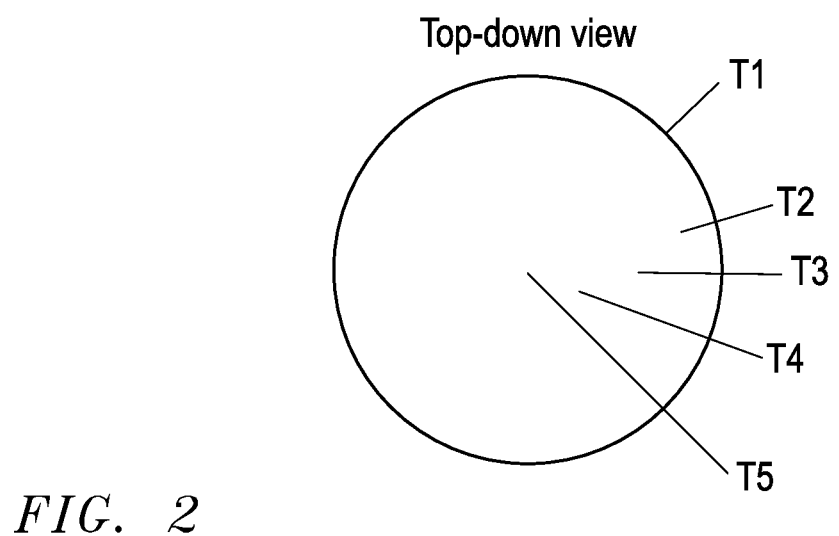
FIG. 2 shows schematically a top view of the location of thermocouples in the device of FIG. 1.

An ammonia delivery device was made from stainless steel in the form of a cylindrical container, having the dimensions 2R0=H=10 cm, where R0 is the inner radius and H is the height of the reactor. A photograph of the device is shown in FIG. 1. The device was provided with five wells for insertion of thermocouples placed perpendicular to the tangent of the reactor circumference for determining the radial temperature distribution. Furthermore, a thermocouple was placed on the outer wall to measure the actual temperature of the heated steel wall. Ammonia-saturated MgCl₂ powder (258.8 grams) was then placed and compacted slightly by manual pressure to a bed density of approximately 331 kg/m³. A thin sheet of quartz cotton was placed on top of the salt to prevent any grains from being carried out of the reactor. As desorption of ammonia from the complex requires elevated temperature, a heating wire was wrapped around the reactor and thermal insulation (Rockwool) was placed on top of this. Using a PC with labview interface, the power to the heating tape surrounding the storage container was turned on/off when the pressure in the buffer was below/above the pressure set-point. The desorbed gaseous ammonia flowed into a small buffer container, that was placed after the desorption unit and having a volume of approximately 200 millilitres. The pressure inside the buffer was measured using a digital Kobold SEN-87 pressure meter. The position of the thermocouples (denoted T1 to T5) are shown in the below table 1 and illustrated in FIG. 2.

TABLE 1

Radial position of five thermocouples

| Thermocouple | Radial distance from inner wall (mm) |
|---|---|
| T1 | 0 (inner wall) |
| T2 | 12 |
| T3 | 26 |
| T4 | 45 |
| T5 | 50 (centre) |

Figure 3:
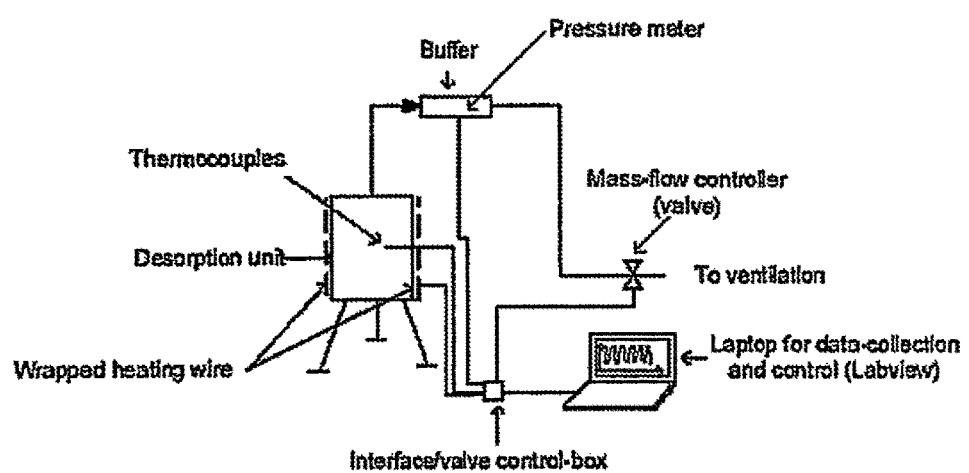
FIG. 3 shows a diagram of the experimental setup.

The total test setup is shown in FIG. 3.

A mass-flow controller (Brooks Smart Mass Flow 5850S calibrated to $NH_3$) dosed the ammonia from the buffer container into a "tailpipe" conveying a stream of carrier gas of air (1000 litres/minute) corresponding roughly to the current of exhaust gas from a small car. In addition to dosing ammonia, the same device also measured the actual flow through the valve in millilitres/minute (at T=298.15 K and P=1 bar). According to the stoichiometry of the SCR reaction, the mixture ratio between $NH_3$ and NOx should be approximately 1:1 (e.g. (Koebel and Kleeman, 2000; Fang and DaCosta, 2003)). The transient NOx concentration (and by that the transient NH3 concentration) in the exhaust gas from a car is very complicated to describe a continuous mathematical function and as an approximation, a sinusoidal function was used. The amplitude was set to 210 millilitres/minute and the period was set to 120 seconds. Due to limitations in the dynamics of the mass-flow controller, however, the resulting outlet flow was not completely sinusoidal. Heating of the desorption unit was controlled using the ON-OFF controller programmed along with the datacollection in Labview. The control parameter was chosen as the buffer pressure and the set-point pressure was set to 5 bars. At such high pressures it is fairly safe to assume that there is no pressure gradient across the porous bed (Lu and Spinner, 1996), and therefore the reactor pressure should be equal to the buffer pressure. It is possible to reduce the set-point pressure, which will reduce the temperature required for desorption. However, the main reason for the choice of set-point pressure was to maintain a well-defined flow through the mass-flow controller. With proper flow-mapping the flow through the valve should in principle be independent of the back-pressure.

Figure 4:
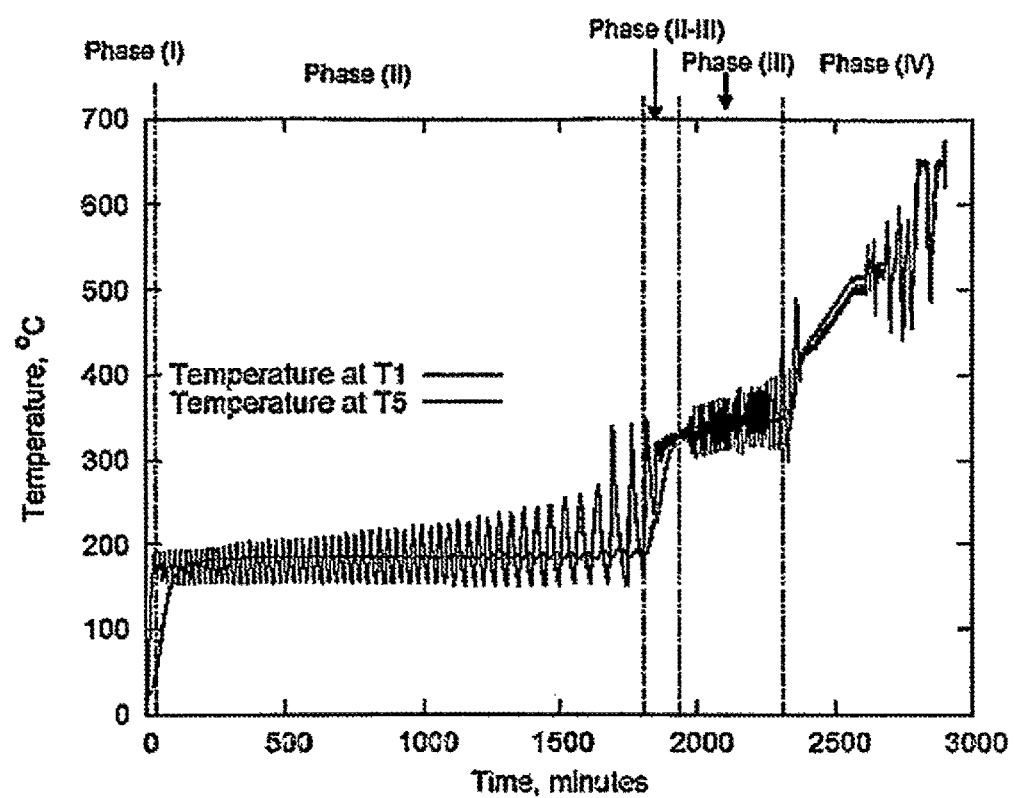
FIG. 4 shows a graphical representation of the desorption of the ammonia.
Figure 5:
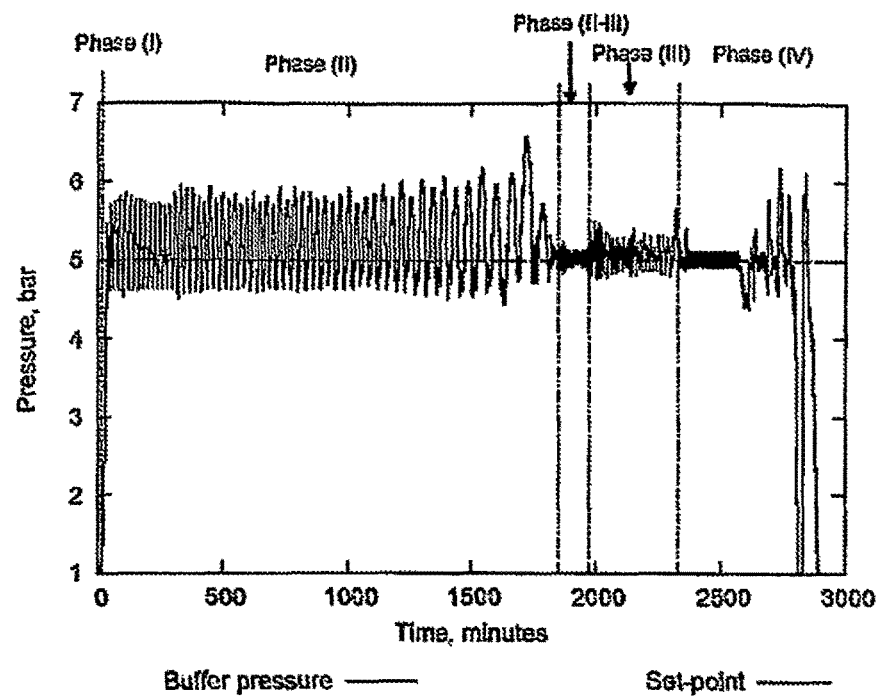
FIG. 5 is a plot of the buffer pressure during desorption of the ammonia.

The result of the experiment appears from FIG. 4 which shows a graphical representation of recorded temperature at positions T1 and T5 (the melting point for $MgCl_2$ is 714° C.) during desorption of ammonia from the ammonia-saturated $MgCl_2$ powder, and FIG. 5 shows the recorded pressure in the buffer container during the experiment. Phases I-IV and an intermediate phase (phase (II-III)) have been indicated in FIGS. 4 and 5 and are explained more in detail below.

During the experiment, a controller increased the temperature of the unit slowly to sustain a desired pressure of ammonia in the buffer. In the case of the experiment in FIGS. 4 and 5, the buffer was kept at a pressure close to 5 bars. Other experiments were done at lower buffer pressures. This resulted in a lower operating temperature due to the thermodynamics of the storage material. A higher ammonia pressure gives a higher desorption temperature.

Phase (I)—Warm-Up

During this phase the pressure was allowed to build up to the set-point, no ammonia was extracted during this initial warm-up phase.

Phase (II)—Desorption of First Four Moles of Ammonia

Figure 6:
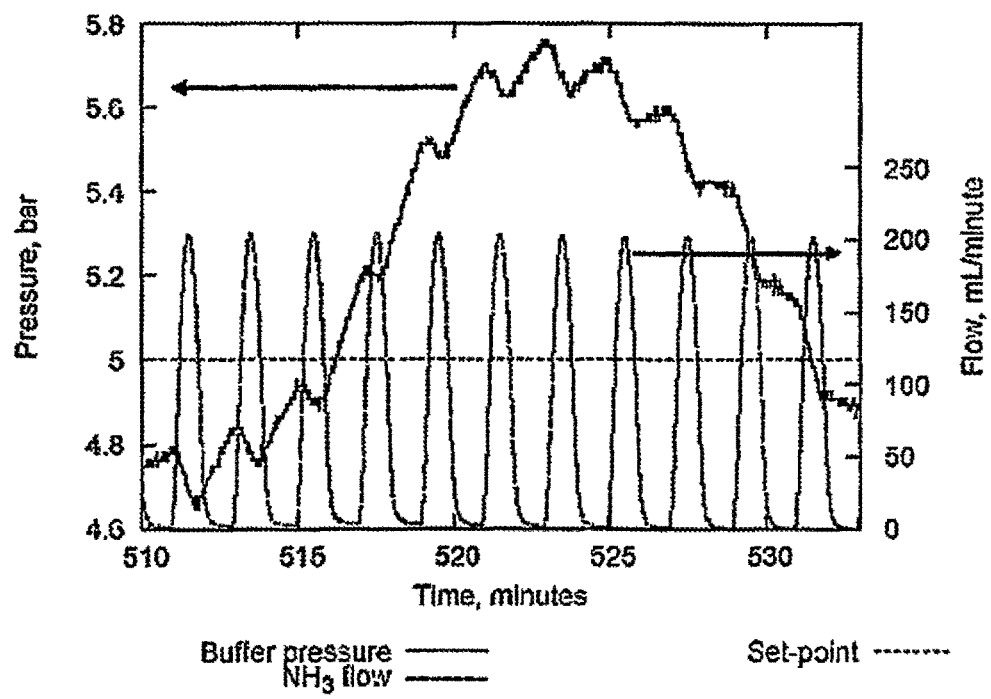
FIG. 6 shows the pressure and flow in a single pressure oscillation period during desorption,
FIG. 7 schematically shows a device for compression of an ammonia delivery material,
FIG. 8 schematically shows an embodiment of an ammonia delivery device of the invention,
FIG. 9 schematically shows another embodiment of an ammonia delivery device of the invention.

When reaching the set-point buffer pressure, heating was turned off and the mass-flow controller began to dose ammonia. This eventually caused the pressure to drop and heating was turned on again. Switching between on and off for dosing ammonia caused the pressure to oscillate around the set-point. The small oscillations in the measured outflow (nearly sinusoidal flow) can also be seen in the large oscillations around the set-point, as it is shown in FIG. 6.

The large (and slow) oscillations are also seen in the temperature, and due to the low effective thermal conductivity of the porous solid matrix this is most pronounced in the vicinity of the source of heat (T1). During phase II, the oscillations of the pressure and temperature continued to increase in amplitude and decrease in frequency. Combined with the large temperature gradients observed from FIG. 4 this indicates, that the reaction proceeds along an inward moving reaction front. Such a moving front will increase the way of heat-transfer, which will result in increasing amplitude and decreasing frequency of the pressure/temperature oscillations.

Phase II-III—Transition Phase

As the front moves toward the centre of the reactor, less and less ammonia is available for desorption. Eventually, a new front builds up near the heat-source, in which the fifth mole of coordinated ammonia is desorbed. This again reduces the way needed for heat-transfer and thus reduces the amplitude and increases the frequency of the oscillations. The apparently lower amplitude of the oscillations in the transition phase as compared to phase III, indicates that there still is ammonia bound as $Mg(NH_3)_6Cl_2$ left for desorption near the centre.

Phase III—Desorption of Fifth Mole of Ammonia

The sudden increase of the amplitude marks the end of the transition phase and the beginning of the third phase, in which only the fifth mole of ammonia desorbed. The decrease of the pressure overshoot as compared to phase II is most obviously due to the fact that only one mole of ammonia was released as compared to the four moles released during phase II (cf. reactions 2 and 3), therefore reducing the overall desorption rate. However, the increased loss of heat to the surroundings due to the higher temperature level at T1 could also help moderating the temperature/pressure peaks. During this phase it is difficult to see any increase of amplitude and decrease of frequency of the pressure oscillation; however the peak temperature does increase throughout the phase.

Phase IV—Desorption of Sixth Mole of Ammonia

The amplitude of the pressure overshoot was even smaller during this phase than for phase III. One mole of ammonia was desorbed in both phase III and IV, but the increased loss of heat at T1 during phase IV helped moderating the temperature peaks and hence, also the overshoot of pressure.

Since this experiment was run for several hours, including a night, a maximum allowable temperature of 500° C. was set as a safety parameter. From FIGS. 4 and 5 it can be seen, that this temperature was reached, which resulted in the loss of buffer pressure. As this occurred during the night, it was not corrected until the following morning by setting the maximum allowable temperature to 650° C. (64° C. less than the melting point temperature of $MgCl_2$). The temperature and pressure fluctuated a somewhat during this phase. This might indicate some sort of build-up of pressure and subsequent release due to mass-transfer hindrance. During phase IV, the temperature throughout the reactor became quite high. However, in an optimized system the set-point for pressure will certainly be lower than the chosen 5 bars, which will also reduce the required temperature for all three desorption reactions to occur.

Integration of the outlet flow curve in time yields the total accumulated volume of $NH_3$ released through the valve. This value can be converted to number of moles by means of the ideal gas law. In order for the process to be efficient, this value should be close to the theoretically predicted amount of $NH_3$ contained in the salt. This is easily calculated, since the ratio of $MgCl_2$ and $NH_3$ in a 100% saturated salt is 1:6. The stoichiometric calculations showed that, theoretically, 7.88 moles of ammonia should be stored within the given mass of $Mg(NH_3)_6Cl_2$ salt (258.8 grams), while the integration of the calibrated signal from the mass flow controller revealed that 7.86 moles of ammonia was released through controller giving a very high storage efficiency of approximately 99.8%.

Example 2

Compression of Solid Ammonia Storage Medium

Figure 7:
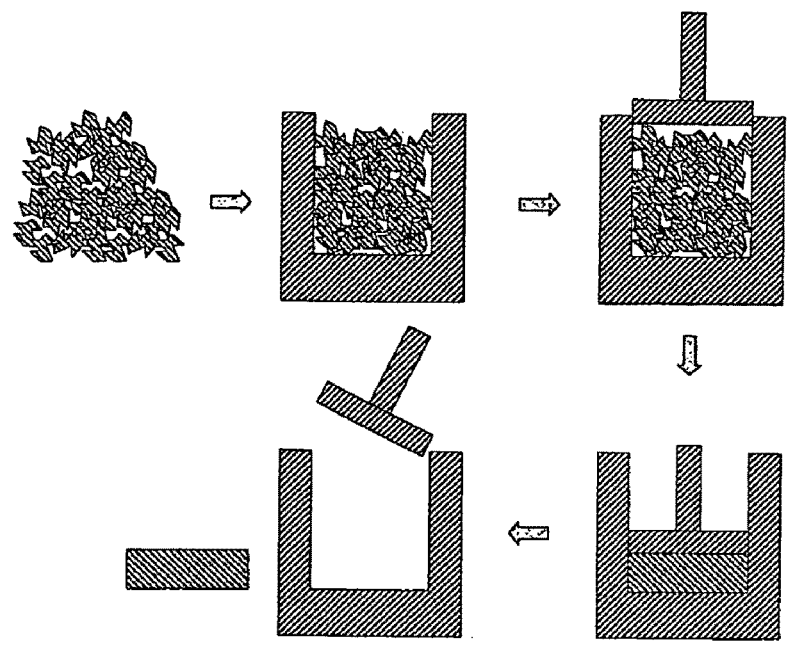

FIG. 7 schematically shows a device compression of the solid ammonia delivery material for the preparation of cylindrical tablets (dimensions: 13 mm in diameter; 10 mm high). In this embodiment, the solid ammonia delivery material was compressed in a chamber by applying a pressure of 2-4 tons/cm$^2$ using a piston compressing the powdered saturated storage material. When the piston was removed, the delivery material was in the desired shape of e.g. a tablet, a cylinder or a rod, and had a density above 80% of the theoretical crystal density.

Figure 8:
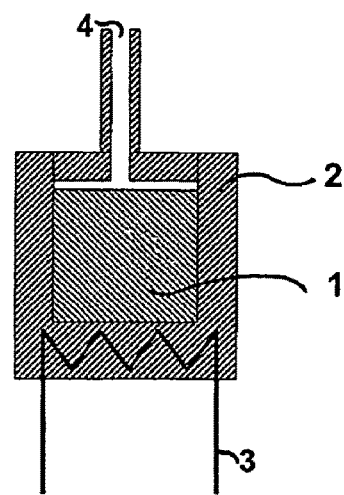

FIG. 8 schematically shows an embodiment of an ammonia delivery device of the invention for desorption of the compressed delivery material. In this embodiment, one or more tablets of solid ammonia delivery material 1 are placed in a container 2, which can be heated by a heating device 3. Desorbed ammonia leaves the container through a nozzle 4. Heat for the heating device 3 may be provided by e.g. resistive electric heating or chemical reactions. Such chemical reactions could be generated e.g. by combustion of a part of the released ammonia. If the delivery device is used in connection with SCR of NOx in exhaust gases, waste heat from the engine producing the gases can also be applied.

Figure 9:
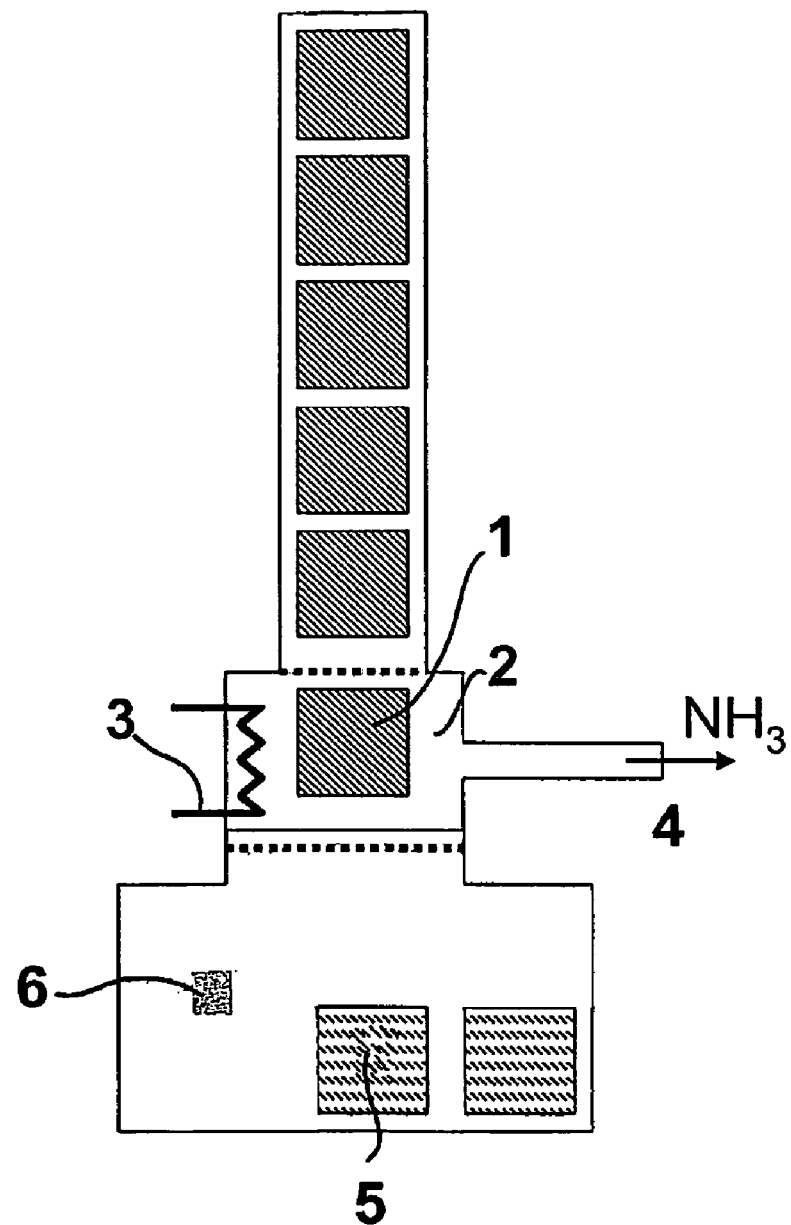

FIG. 9 schematically shows another preferred embodiment where only a part of the stored solid delivery material 1 is heated at a time. The solid delivery material is stored in compressed form, and introduced into a hot chamber 2 one at the time at intervals corresponding to the requirement for gaseous ammonia. The hot chamber is heated by a heating device 3 operated after the same principles as described above 2. Gaseous ammonia leaves the hot chamber through a nozzle 4, and when all ammonia is desorbed from a tablet 5 of solid ammonia delivery material, it is discarded into a separate container 6.

In a similar type of embodiment, the entire storage material is separated into a number of compartments each having their own heating source so that it is possible to have complete desorption of a given fraction of the material without using any moving parts to replace saturated/unsaturated salt e.g. on-board the vehicle during use.

The bed-density of the delivery material used in Example 1 was quite low (331 kg/m$^3$ when compacted gently by hand) when compared to the density of $MgCl_2$ and $Mg(NH_3)_6Cl_2$ (1252 kg/m$^3$, cf. the below table 2).

TABLE 2

| Salt | Mass density kg/m$^3$ | Molar volume cm$^3$/mole | Source |
| --- | --- | --- | --- |
| $MgCl_2$ | 2325 | 40.86 | CRC Handbook 2004 |
| $Mg(NH_3)_6Cl_2$ | 1252 | 157.4 | Gmelins Handbook 1939 |

A low density means that the entire storage system would require more space. This problem was solved by compressing $Mg(NH_3)_6Cl_2$ into solid rods having a density of 1219 kg/m$^3$(97% of the solid density). TPD experiments confirmed that it was possible to desorp all ammonia from this tablet, thus increasing the potential storage capacity by a factor of 3.7 (on a molar basis) to approximately 93% of the volumetric ammonia storage capacity of liquid ammonia. A nearly quantitative desorption of ammonia from the dense material is possible because the front of desorption leaves behind a porous layer of anhydrous $MgCl_2$. This automatically generates the required pore system needed for mass-transfer through the structure. This is considered an ideal combination of a) an initially very compact structure having almost no void and being easy to handle, b) a high capacity for containing and delivering ammonia, c) a low external surface area, and d) a high degree of safety.

Example 3

Comparison of the Use of Ammonia Delivery Devices of the Invention and Urea-Technology By calculating the amount of NOx (assumed to be pure NO) generated per kilometre in a model fuel (taken as pure n-octane, $\rho$=696.8 kg/m3), the corresponding driving distance for a given amount of ammonia or urea can be found.

Based on the EURO 3 standards (The European Parliament, 1998) as well as by the values used by some researchers (Hyundai Motor Co.: Choi et al., 2001), the assumed NOx concentrations and the fuel economies are: 150 ppm and 10 km/litre for stoichiometric combustion (typically gasoline) and 300 ppm and 15 km/litre for lean burn combustion ($\lambda$=1.5, typically diesel).

Taking 1 litre (or 696.8 g) of fuel as a basis of calculations the generated NOx per. kilometre would be 5.87·10$^{-2}$ mole/km or 0.18 g/km for stoichiometric combustion, while for lean burn combustion ($\lambda$=1.5), the NOx emission is 1.15·10$^{-2}$ mole/km or 0.34 g/km.

In the below table 3 is shown the required mass/volume of the high-density $Mg(NH_3)_6Cl_2$ needed to drive 20,000 km (excluding the mass/volume of any equipment) compared to that of the 32.5% urea solution. The comparison is based on the combustion of pure n-octane and the above assumptions. The fuel is assumed to be pure n-octane and the exhaust is assumed to have an average molar fraction of 300 ppm NOx. The engine is assumed to run lean with a fuel economy of 15 km/litre fuel. The density of a 32.5% wt/wt urea solution is 1090 kg/m³ and the density of the Mg(NH₃)₆Cl₂ is assumed to be 1219 kg/m³.

TABLE 3

| Material | | Mass/20,000 km kg | Volume/20,000 km litre |
|---|---|---|---|
| 1 | Urea | 21.2 | 19.4 |
| 2 | Mg(NH3)₆Cl₂ | 7.5 | 6.2 |
| Ratio 1:2 | | 2.8 | 3.1 |

The results clearly show the superior ammonia storage capacity of Mg(NH₃)₆Cl₂ over that of the urea solution. Combined with a high efficiency of approximately 99% this ammonia storage compound is very appropriate for the purpose. Due to the nature of the compaction of the materials, the present invention is also superior to the disclosures of WO 99/01205, where the preferred embodiment of granulated material of either Ca(NH₃)₈Cl₂ or Sr(NH₃)₈Cl₂ will results in a reduction in volumetric capacity of the theoretical salt densities by a factor of 1.5-2.

REFERENCES

Fang, H. L., DaCosta, H. F., 2003. Urea thermolysis and NOx reduction with and without SCR catalysts. Applied Catalysis B: Environmental 46, 17-34.
Goetz, V., Marty, A., 1992. A model for reversible solid-gas reactions submitted to temperature and pressure constraints: Simulation of the rate of reaction in solid-gas reactor used as chemical heat pump. Chem. Eng. Sci. 47 (17-18), 4445-4454.
H. Van Vlack, L., 1989. Elements of Materials Science and Engineering, sixth Edition. Addison-Wesley Publishing Company Inc.
Hyundai Motor Co.: Choi, S.-m., Yoon, Y.-k., Kim, S.-j., Yeo, G.-k., Heesung Engelhard Corp.: Han, H.-s., 2001. Development of UREA-SCR system for light-duty diesel passenger car. SAE Technical Paper Series.
Koebel, M.; Elsener, M., Kleeman, M., 2000. Urea-scr: A promising technique to reduce NOx emissions from automotive diesel engines. Catalysis Today 59, 335-345.
Liu, Chun Yi & Aika, K.-i., 2004. Ammonia absorption on alkaline earth halides as ammonia separation and storage procedure. Bull. Chem. Soc. Jpn. 77 (1), 123-131.
Lu, Hui-Bo; Mazet, N., Spinner, B., 1996. Modelling of gas-solid reaction—coupling of heat and mass transfer with chemical reaction. Chem. Eng. Sci. 51(15), 3829-3845.
Matsumoto, S., 1997. Recent advances in automobile exhaust catalyst. Catalysis Surveys from Japan 1, 111-117.
Olovsson, I., 1965. Packing principles in the structures of metal ammine salts. Acta Cryst. 18, 889-8.93.
CRC Handbook, 2004. Handbook of chemistry and physics (web edition).
Gmelins Handbuch, 1939. Magnesium teil b: Die verbindungen des magnesiums (27).
The European Parliament, 1998. Directive 98/69/ec.
The European Parliament, 1999. Directive 1999/96/ec.
The European Parliament, 2003. Directive 2003/17/ec.
Touzain, P., Moundamga-Iniamy, 1994. Thermochemical heattransformation: Study of the ammonia/magnesium chloride-GIC pair in a laboratory pilot. Mol. Crys. Liq. Cryst. 245, 243-248.

What is claimed is:

1. A method for the selective catalytic reduction of NO$_x$ in waste gas containing oxygen by using ammonia and a reduction catalyst, wherein the method comprises providing gaseous ammonia by heating a solid storage medium capable of releasing ammonia and comprising one or more salts of general formula:

$M_a(NH_3)_nX_z$,

wherein M represents one or more cations selected from alkaline earth metals and transition metals, X represents one or more anions, a represents the number of cations per salt molecule, z represents the number of anions per salt molecule, and n is a number of from 2 to 12, the one or more salts having been compressed to a bulk density above 70% of a skeleton density before use thereof, and controlling a release rate of ammonia depending on a content of NO$_x$ in the waste gas.

2. The method of claim 1, wherein M comprises at least one metal selected from Mn, Fe, Co, Ni, Cu, and Zn.

3. The method of claim 1, wherein X comprises at least one of sulfate and chloride.

4. The method of claim 1, wherein M comprises Mg.

5. The method of claim 1, wherein before use the one or more salts have been compressed to a bulk density above 80% of the skeleton density.

6. The method of claim 1, wherein before use the one or more salts have been compressed to a bulk density above 85% of the skeleton density.

7. A method for the selective catalytic reduction of NO$_x$ in an exhaust gas from a combustion process, wherein the method comprises contacting the exhaust gas with ammonia as reducing agent, the ammonia being provided by desorption of ammonia from one or more salts of general formula:

$M_a(NH_3)_nX_z$,

wherein M represents one or more cations selected from alkaline earth metals and transition metals, X represents one or more anions, a represents the number of cations per salt molecule, z represents the number of anions per salt molecule, and n is a number of from 2 to 12, the one or more salts having been compressed to a bulk density above 70% of a skeleton density before use thereof.

8. The method of claim 7, wherein M comprises at least one metal selected from Mn, Fe, Co, Ni, Cu, and Zn.

9. The method of claim 7, wherein X comprises at least one of sulfate and chloride.

10. The method of claim 7, wherein M comprises Mg.

11. The method of claim 7, wherein the one or more salts comprise Mg(NH₃)₆Cl₂.

12. The method of claim 7, wherein before use the one or more salts have been compressed to a bulk density above 80% of the skeleton density.

13. The method of claim 7, wherein before use the one or more salts have been compressed to a bulk density above 85% of the skeleton density.

14. A method for the selective catalytic reduction of NO$_x$ in an exhaust gas from a combustion process, wherein the method comprises contacting the exhaust gas with ammonia delivered from an ammonia delivery device that comprises a container having therein one or more salts of general formula:

$M_a(NH_3)_nX_z$,

wherein M represents one or more cations selected from alkaline earth metals and transition metals, X represents one or more anions, a represents the number of cations per salt molecule, z represents the number of anions per salt molecule, and n is a number of from 2 to 12, the one or more salts having been compressed to a bulk density above 70% of a skeleton density before use thereof, and wherein the container comprises one or more closable outlet openings connected to a pipe and further is provided with an element for heating the container and the one or more salts contained therein.

15. The method of claim 14, wherein M comprises at least one metal selected from Mn, Fe, Co, Ni, Cu, and Zn.

16. The method of claim 14, wherein X comprises at least one of sulfate and chloride.

17. The method of claim 14, wherein M comprises Mg.

18. The method of claim 14, wherein the one or more salts comprise $Mg(NH_3)_6Cl_2$.

19. The method of claim 14, wherein before use the one or more salts have been compressed to a bulk density above 80% of the skeleton density.

20. The method of claim 14, wherein before use the one or more salts have been compressed to a bulk density above 85% of the skeleton density.

* * * * *